United States Patent [19]

Horn et al.

[11] Patent Number: 4,600,623
[45] Date of Patent: Jul. 15, 1986

[54] PADDED MATERIAL

[75] Inventors: Falk R. Horn, Laudenbach; Roland Schmitt, Weinheim-Sulzbach; Manfred Gürr, Birkenau-Hornbach; Rolf Grimm, Weinheim, all of Fed. Rep. of Germany

[73] Assignee: Firma Carl Freudenberg, Weinheim, Fed. Rep. of Germany

[21] Appl. No.: 665,178

[22] Filed: Oct. 26, 1984

[30] Foreign Application Priority Data

Dec. 24, 1983 [DE] Fed. Rep. of Germany ....... 3347062

[51] Int. Cl.$^4$ ............................................. B32B 3/26
[52] U.S. Cl. .................................... 428/151; 428/159; 428/286; 428/314.4; 428/316.6
[58] Field of Search ............... 428/151, 156, 158, 159, 428/160, 247, 316.6, 319.7, 166, 284, 286, 287, 304.4, 314.4, 314.8, 904

[56] References Cited

U.S. PATENT DOCUMENTS

| 2,962,406 | 11/1960 | Rosa | 428/159 |
| 3,582,095 | 6/1971 | Bogaert | 428/314.4 |
| 3,954,537 | 5/1976 | Alfter et al. | 428/314.8 |

FOREIGN PATENT DOCUMENTS

| 1488270 | 10/1977 | United Kingdom | 428/319.7 |
| 1595794 | 8/1981 | United Kingdom | 428/316.6 |

Primary Examiner—William J. Van Balen
Attorney, Agent, or Firm—Felfe & Lynch

[57] ABSTRACT

A padded material consists of a porous resilient layer which is bonded on one side to a web of foam and on the other side to a covering web, at least the foam web and the covering web consisting of a thermoplastically softenable material, and the covering web and the resilient layer being softened by heating and compressed in a pore-free manner in closely adjacent areas, and cooled to stabilize the structure.

5 Claims, 1 Drawing Figure

U.S. Patent  Jul. 15, 1986  4,600,623
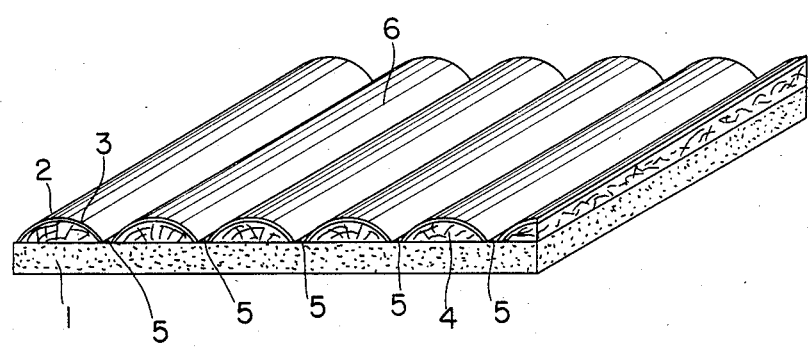

PADDED MATERIAL

BACKGROUND OF THE INVENTION

The invention relates to a padded material, especially for the manufacture of fashion footwear, shoe straps, kidney belts, and protective clothing.

The padded materials heretofore proposed for the above kinds of applications consist of artificial leather or natural leather backed with a layer of soft polyurethane foam. Their manufacture requires a relatively great amount of labor and accordingly they are expensive.

The soft polyurethane foam backing is furthermore a material which has a great ability to absorb and store moisture, and which is rapidly destroyed by chemical aging under the action of water. The desire therefore arose for an easy-to-fabricate padded material which is not capable of storing up water to any appreciable extent and which is not destroyed by the action of water.

THE INVENTION

To accomplish this object, a padded material of the kind described above is proposed in accordance with the invention, consisting of a porous resilient layer which is joined on one side to a foam web and on the other side to a covering web, at least the foam web and the covering web consisting of a waterproof thermoplastically softenable material, and at least the covering web is softened by heating and compressed with the resilient layer pore-free in closely adjacent areas, and cooled to stabilize the structure.

The proposed padded material is supplied to the readymade clothing manufacturer as a flexible foreproduct, and can be fabricated by the clothing manufacturer in any desired manner, for example by cutting to pattern and sewing or cementing to other materials.

Due to the waterproof, thermoplastic properties of the layers covering both sides of the resilient layer, namely the foam web and the covering web, it is possible to stamp shapes from the sheet material that is supplied as a semifinished product and weld them to one another along the circumferential margins. The space containing the resilient layer is in this manner sealed up on all sides and is unable to absorb moisture even when completely flooded with water.

Any desired material can be used for making the covering web, but especially an impermeable artificial leather made from PVC. It can be covered, if desired, with a nonporous film improving the wear resistance of the surface, which can be given a leather-like texture and/or coloring.

It is desirable to use a web of closed-cell, crosslinked polyethylene foam in making the foam web, bulk weights between 30 and 120 kilograms per cubic meter being preferred. The material has a closed-cell pore structure and highly water-proof and water-repellant properties, which maintain its useful life for long periods of time.

The ratio determined from the thickness of the foam web and the sum of the thicknesses of the covering web bonded and compressed in adjacent areas with the resilient layer is to amount to from 1 to 3 in order to combine good padding effect with otherwise excellent flexibility. The expression "sum" here means the total thickness of the covering web and the resilient layer in the middle between compressed areas.

The resilient layer can be made of any desired materials having good porosity and good resilience perpendicular to their length. The use of nonwovens consisting of randomly laid fibers and/or filaments has proven especially suitable for the proposed padded material. These fibers and filaments consist preferably of synthetic material, especially polyester, and in this case they have good resilience over long periods of time. They can be bounded autogeneously or by a binding agent, and are relatively coarse, having a fineness, for example, of 30 to 50 dtex. (dtex is the weight of a fiber or filament with a length of 10.000 m).

The three webs forming the padded material are best laminated together totally, i.e., over their entire interfaces. In addition, the covering webs and the resilient layer are compressed together pore-free in closely adjacent portions. These portions, which largely determine the outward appearance of the material, can be combined in any desired manner. An especially attractive appearance, however, is achieved when the portions consist of strips running parallel to one another. The width of areas occupied by the individual strips are to correspond approximately to the total thickness of the laminate formed by the uncompressed resilient layer and the covering web, in order to assure a uniform drape of no preferred direction. Especially advantageous properties are obtained when the ratio computed from the spacing on centers between adjacent strips and their width is between 28, preferably between 10 and 14.

A different constitution of the individual strips is possible. If desired, they can also have a winding and/or crossing pattern, in order further to improve general stability and elasticity.

The proposed padded material is distinguished by an especially great ability to withstand mechanical stresses, combined with low weight per unit of area.

It can be worked easily and inexpensively on conventional equipment and gives an attractive appearance to products equipped wih it. Its useful life, due to the absence of the ability to absorb moisture and excellent resistance to aging, is extraordinarily long, and therefore the proposed padded material is especially suitable also for the manufacture of long-lasting products of a high standard of quality.

In the appended drawing a sample cut from an exemplary padded material of the kind proposed by the invention is represented in perspective, and it is described herewith:

The padded material contains a web 1 of closed-cell, crosslinked polyethylene foam. It has a thickness of 2.5 mm and a weight of 190 grams per square meter. The material is extremely resistance against the influence of water, chemicals and non ageing.

A resilient layer of randomly laid textile fibers is bonded to the upper side of the foam web. It consists of polyester filaments with a fineness of 35 dtex and has a weight of 60 g/m$_2$ at a thickness in the uncompressed state of 1.8 mm. The individual filaments are bonded to one another by a bonding agent or needle punched.

Instead of a random fleece of this kind, woven and/or knit fabrics can be used, if desired, provided they have good resilience in the vertical direction. Fabrics suitable for this purpose are known to the person skilled in the art.

A continuous covering web is bonded to the upper side of the resilient layer 4. This one is a two-layer web and contains a lower foam layer 2 and an upper covering film 3, the latter having a leather-like texture and coloring, giving the padded material a leather-like appearance. The foam layer consists of PVC having an open pore structure and a thickness of 0.8 mm.

The covering web and the resilient layer 4 are compressed pore-free along strips 5 running parallel to one another. The strips have a width of about 1.1 mm, and a distance from one to the other of 13 mm. They give the surface 6 of the padded material a distinctive appearance.

It will be understood that the specification and examples are illustrative but not limitative of the present invention and that other embodiments within the spirit and scope of the invention will suggest themselves to those skilled in the art.

We claim:

1. A padded material comprising a porous resilient layer of a nonwoven material of bonded randomly laid fibers and/or filaments, said layer being bonded on one side thereof to a foam web of a closed-cell crosslinked polyethylene foam and on the other side thereof to a covering web, said covering web being of a foam artificial leather of PVC, at least the foam web and the covering web consisting of a waterproof thermoplastically softenable material, and at least the covering web is softened by heating and compressed with the resilient layer being compressed pore-free in closely adjacent areas and cooled to stabilize the structure.

2. The padded material of claim 1, wherein the thickness ratio of the form web and the uncompressed covering web bonded to the uncompressed resilient layer is from 1 to 3.

3. The padded material of claim 1, wherein the closely adjacent areas consist of strips running parallel to one another.

4. The padded material of claim 3, wherein the width of the strips and the thickness of the laminate formed from the uncompressed resilient layer and the uncompressed covering web are substantially equal.

5. The padded material of claim 4, wherein the ratio of the distance between centers of the consecutive strips to their thickness is from 8 to 20, and preferably 10 to 14.

* * * * *